DRAFTSMAN

Reissued Mar. 3, 1925.

Re. 16,016

UNITED STATES PATENT OFFICE.

JOSEPH SEYER, OF HAWTHORNE, NEW JERSEY, ASSIGNOR TO STANDARD SILK DYEING CO., OF PATERSON, NEW JERSEY, A CORPORATION OF NEW JERSEY.

WASHABLE DYED SILK PIECE GOODS AND PROCESS OF DYEING THEM.

No Drawing. Original No. 1,446,860, dated February 27, 1923, Serial No. 604,390, filed December 1, 1922. Application for reissue filed November 28, 1924. Serial No. 752,826.

*To all whom it may concern:*

Be it known that I, JOSEPH SEYER, a citizen of the United States, and a resident of Hawthorne, county of Passaic, and State of New Jersey, have invented certain new and useful Washable Dyed Silk Piece Goods and Processes of Dyeing Them, of which the following is a specification.

This invention relates to a new article of manufacture or product consisting of a washable silk fabric which has been dyed in the form of piece goods, and the processes of producing and dyeing such fabrics.

Hitherto no successful way has been found of dyeing silk piece goods in various colors so as to produce a washable article, that is, one that may be washed in warm soap water without losing its color or without becoming spotted or irregularly changed in its shade of color. My invention has succeeded in producing silks dyed in various colors in the form of piece goods, and it has furthermore achieved the production of washable silks which will not impart their colors to a washing liquid such as an aqueous soap solution. My invention has accordingly as an object the production of washable silks dyed in any desired shade of color in the form of piece goods, and it has as a further object the production of washable silks which will not impart color to the washing liquid. It is also an object of my invention to produce washable silks dyed with colors of many kinds and shades that are relatively inexpensive, and to fix these colors on the silks.

A further object is to avoid the uneven dyeing and undesirable results obtained by mordanting silk previous to the beginning of the dyeing operation. A still further object is to produce piece goods of silk which will be relatively fast to perspiration, light, and ironing. It is also an object to produce the above results with pure silk and also with mixed goods.

Further objects will appear hereinafter.

In the preferred embodiment of my invention I proceed by four different processes according to whatever color and shade is desired, each process varying more or less from the other in certain details. I shall therefore describe each process in detail. For the purpose of illustration of the application of each process to the production of certain colors, I will list the colors named on the Color Card of America issued by The Textile Color Card Association of the U. S. (5th ed.).

*Process #1.*

This process, to be described below, is applicable for the following colors:

| | | | | |
|---|---|---|---|---|
| White S. 1001 | Ivory S. 1041 | Cream S. 1045 | Leghorn S. 4115 | Maize S. 3115 |
| Apricot S. 4123 | Ocean green S. 5164 | Ashes of roses S. 2173 | Chartreuse S. 5413 | Salmon pink S. 2145 |
| Flesh S. 2131 | Pink 1 S. 2103 | Pink 2 S. 2105 | Pink 3 S. 2107 | Lavender S. 7123 |
| Nile green S. 5143 | Lt. blue 1 S. 6103 | Lt. blue 2 S. 6105 | Lt. blue 3 S. 6107 | Lt. blue 4 S. 6109 |
| Champagne S. 4183 | Beige S. 4185 | Ecru S. 3183 | Fawn S. 3185 | Old rose S. 2183 |
| Orchid S. 7183 | Amethyst S. 7185 | Mignonette S. 5183 | Reseda S. 5185 | Heliotrope S. 7814 |
| Lemon S. 4005 | Golden rod S. 4025 | Orange S. 3005 | Burnt orange S. 3025 | Terra cotta S. 4285 |
| Mahogany S. 4287 | Nickel S. 8115 | Silver S. 8113 | Pearl grey S. 8111 | Steel S. 8065 |
| Wild rose S. 2163 | Tan S. 3083 | Gold brown S. 3285 | Chamois S. 4383 | Gold S. 4815 |
| Old gold S. 4817 | Bronze S. 5385 | Lilac S. 7163 | Sage S. 5823 | Topaz S. 3485 |
| Buff S. 3842 | Cornflower S. 6123 | Maple S. 4133 | Honey S. 4135 | Laurel pink S. 2135 |
| Mist S. 1803 | Mermaid S. 1583 | Vestal S. 1783 | Horizon S. 1683 | Spray S. 1653 |
| Tearose S. 1233 | Coral S. 2133 | Sunset S. 1433 | Iris S. 1623 | Primrose S. 1403 |
| Blossom S. 1223 | Lt. blue 5 S. 6161 | Lt. blue 6 S. 6162 | Pink 4 S. 2108 | Pink 5 S. 2109 |

The process is conducted as follows: The piece goods are treated in a continuously boiling bath containing 250 gallons of water, 10 lbs. sodium phosphate ($Na_2HPO_4 12H_2O$), one lb. 50% strength Turkey-red oil (alkaline), one gal. 50% soap solution, and the goods are worked therein for 20 minutes, after which are added to the bath 20 lbs. Glauber's salts ($Na_2SO_4.10H_2O$) and a dyestuff such as a direct, basic, vat, or sulfur dye according to whatever shade is desired. (Examples of these dyes are given below). The Turkey-red oil has a mordanting action having the effect of fixing the dye or color on the goods under the conditions of the described operation. The goods are then given a cleansing soap bath at a boiling temperature and the goods are worked for 30 minutes. They are then washed well and acidulated. This method is applicable generally to light shades but may be used for other colors also.

*Process #2.*

This process is applicable for the following colors:

| | | | | |
|---|---|---|---|---|
| Torquoise S. 6153 | Geranium S. 2035 | Beaver S. 3187 | Strawberry S. 2185 | Emerald S. 5005 |
| Hunter S. 5007 | Myrtle S. 5067 | Saxe blue S. 6053 | Electric S. 6055 | Sapphire S. 6057 |
| Plum S. 7187 | Prune S. 7817 | Eggplant S. 7905 | Copenhagen S. 6183 | Delft S. 6185 |
| Slate S. 8067 | Graphite S. 8965 | Smoke S. 8935 | Taupe S. 8845 | Castor S. 8843 |
| Raspberry S. 2165 | National S. 6005 | Yale blue S. 6007 | Marine S. 6083 | Cadet S. 6853 |
| Regimental S. 6855 | Olive S. 5485 | Evergreen S. 5499 | Cherry S. 2063 | Ruby S. 2065 |
| Am. Beauty S. 2067 | Peacock S. 6505 | Wisteria S. 7195 | Magenta S. 7285 | Fuchsia S. 7205 |
| Bottle green S. 5827 | Violet S. 7003 | Pansy S. 7005 | Purple S. 7007 | Old china S. 6184 |
| Japan blue S. 6187 | Moss S. 5483 | Carmine S. 2263 | Bluebird S. 6065 | Spring green S. 5043 |
| Indiana S. 2064 | | | | |

The process is conducted as fol'ows: The piece goods are dyed in a gum soap liquor, otherwise known as "boiled off liquor", acidulated with 2 lbs. 66° Bé. and 20 lbs. respectively of sulfuric or acetic acid, and the operation is begun by working the goods in this bath for 20 minutes, after which the dyestuffs such as basic, direct or acid dyes are added to produce the shade desired as above. When the goods match the objective sample, there are added to the dye bath of 250 gallons liquor, 5 lbs. tannic acid ($C_{14}H_{10}O_9 2H_2O$) and the goods are worked for one hour continuously at a boil. They are then we'l washed and treated in a cold bath of water comprising two hundred and fifty gallons, with 4½ lbs. tartar emetic ($C_4H_4O_6KSbO.\frac{1}{2}H_2O$) for 40 minutes. After this they are well washed and then cleaned in a soap bath at 160° F. The treatment is now concluded by washing well and acidulating.

*Process #3.*

This process is applicable for the following colors:

| | | | | |
|---|---|---|---|---|
| Chestnut S. 3925 | Seal S. 3928 | Navy 1 S. 6085 | Navy 2 S. 6925 | Navy 3 S. 6975 |
| Navy 4 S. 6985 | Brown S. 3295 | Tobacco S. 3945 | Negro S. 3948 | Olive brown S. 4856 |

The process is conducted as follows: The piece goods are dyed in a boiling water liquor or in a gum soap liquor, acidulated with (per 250 gallons liquor) 20 lbs. acetic acid, using direct dyes according to the shade desired, and continuing the boiling treatment until the goods are dyed to the desired shade. They are then treated with about six pounds of tannic acid in a water liquor comprising about two hundred and fifty gallons of liquor, at a temperature of 160° F. for one hour. They are then washed well and treated in a cold water bath of two hundred and fifty ga'lons with 4.5 lbs. tartar emetic for 40 minutes, after which they are again well washed. A diazotization is then carried out with 5 lbs. sodium nitrate ($NaNO_2$) in cold water comprising two hundred and fifty gallons containing 2 lbs. sulfuric acid per 250 gallons of liquor. This diazotization, which lasts 20 minutes, is followed by washing well and developing in 250 gal'ons of cold water with 35 lbs. sodium carbonate ($Na_2CO_3 10H_2O$). A cleansing treatment with a soap solution at 160° F. for 40 minutes follows and the goods are then washed well and acidulated.

*Process #4.*

This process is applicable for the following colors and is used with diazotizable dyes:

| | | | | |
|---|---|---|---|---|
| Scarlet S. 2003 | Cardinal S. 2005 | Dk. cardinal S. 2007 | Garnet S. 2009 | Claret S. 2167 |
| Burgundy S. 2169 | Maroon S. 2207 | | | |

The process is conducted as follows: The piece goods are dyed in a boiling water bath with a diazotizab'e dye such as a liquor with primuline dye, and the goods are dyed therein to the required shade, and then diazotized with 5 lbs. sodium nitrate and 2 lbs. sulfuric acid in 250 gallons of cold water for 20 minutes. They are then washed well and developed with 6 lbs. beta naphthol in 250 gallons cold water, worked well for 40 minutes, and then washed. At this point the treatment is continued according to process #1, beginning at the first step thereof, for the purpose of dyeing to the shade desired with basic or direct dyes. The goods as finally dyed are given a cleansing bath of soap water at a boiling temperature and worked for 40 minutes, then washed and acidulated, substantially as in the final step of said process #1.

In the four above-described processes various classes of dyes are mentioned for use in the respective processes, and it is desired to state here some examp'es of the dyes falling under each class. As basic dyes may be used brilliant green, Victoria blue, rhodamine (red), thioflavine T (yellow), and methyl violet 6 B (blue) and 5 R (red); as direct dyes, pontamine green BBX diazoline dark brown, accordine seal brown; as acid dyes, fast red, milling yellow, formyl violet, formyl blue, nigrosine; as vat dyes, argole blue 3 G, helindone red, helindone violet, and substantially all of the other vat dyes; as sulfur dyes, sulfur yellow, sulfur blue, sulfur brown, and substantia'ly all of the other sulfur dyes. This list is illustrative, not exhaustive, as other dyes may be used according to their nature and shade.

For producing a black I proceed as follows: The piece goods are dyed in a bath composed of 500 gallons of water, 30% by weight of fustic extract, 10% by weight of hematine extract (oxidized logwood). The goods are worked in the liquor at the boiling temperature for 20 minutes, and then to the same liquor are added 25% by weight of black iron, 4% by weight of blue stone, and 20% by weight acetic acid (to dissolve precipitate in the bath). The goods are worked at the boiling temperature for one hour, and are then washed well. The goods are now treated in another bath composed of 500 gallons boiling water, 30% hematine extract, and 50 lbs. soap, and they are worked therein for one hour, and then washed. The next step consists in treating the goods in a bath of 500 gallons water at 160° F., containing tannic acid in the proportion of six pounds tannic acid per 250 gallons of dye liquor. This is followed by the tartar emetic treatment as in process #3, namely, four and one-half pounds of tartar emetic per two hundred and fifty gallons of dye liquor. The final dyed goods are given two cleansing soap baths at a boiling temperature, and then washed well and acidulated. There is thus produced a washable black which will not impart a black or dark color to a washing soap liquid below 160° F. or thereabouts.

As a result of the above processes there are produced varieties of dyed silk piece goods which are washable, that is, they may be washed in water containing soap at a temperature of 110° F. and they will, in most cases, stand 180° F. or higher, without suffering unevenness in shade or color, or distinct loss of color. In addition to the highly desirable quality of being washable, these piece silks have also the property of being washable without imparting any substantial amout of their color to the washing liquid, such as water or soap solution. They are also dyed evenly, that is, without irregularity in the color or unevenness of shade. These results have not hitherto been achieved with silk piece goods, and I have not only been able to attain these results in certain colors, but have been able to extend them to all colors and shades thereof. The alizarin dyes, which are used for the production of fast colors in skein silk, are expensive and exist only in a limited number of shades. My new silk goods may accordingly be distinguished from other silk goods by noting several of their qualities as follows: They have been dyed in the piece, and are fast to washing in lukewarm soapy water (about 110° F.) but not fast to boiling soapy water although, as before stated, they may often stand higher temperatures than 110° F., up to about 160° F., or higher. Another feature of my new goods is that they may be produced and sold in all colors and shades of color. My piece-dyed silks are dyed to an even color and will not lose this evenness of color by subsequent washing. A still further characteristic of my silk piece goods is that they will not "bleed" in cold water, that is, impart color thereto, nor will they readily show the marks and effects of perspiration. They may be washed together with silk, cotton, artificial silk, wool, etc., without staining them, the temperature being about 110° F., as above. They also have excellent fastness to light and ironing. In the case of process No. 1, they will have the characteristic of being free from metallic mordants.

While my silk piece goods have been described as being of unmixed silk, it is also possible to make mixed silk goods such as silk and cotton, by the above-described processes according to the nature of the result desired.

In methods 1 to 4 inclusive I have described processes of dyeing silk in various colors, and in method 5 I have described the process of dyeing black, so that by the use of the words "colored silk," or their equivalent, I mean colors other than black.

As many apparently widely different embodiments of my invention may be made without departing from the spirit thereof, I do not intend to limit myself to any particular embodiment except as indicated in the following patent claims.

I claim:—

1. Silk goods dyed in the piece and fast to washing in lukewarm soapy water but not fast to boiling aqueous soapy liquid.

2. Silk goods dyed in the piece and fast to washing in lukewarm soapy water but not fast to boiling soapy water, said goods having the additional property of not imparting a substantial amount of color to an aqueous washing liquid.

3. Silk goods dyed in the piece and fast to washing in lukewarm soapy water but not fast to boiling aqueous soapy liquid, said goods having the additional properties of being in considerable degree fast to light, ironing, and perspiration.

4. Silk goods dyed in the piece and fast to washing in soapy water at about 110° F. to about 180° F., but not fast to boiling soapy water.

5. Silk goods dyed in the piece, and having the properties of not bleeding in cold soapy water, and of giving up color to boiling soapy water.

6. Silk goods dyed in the piece, and having the properties of not staining other fibres in soapy water, and of giving up color to boiling soapy water.

7. Colored silk goods dyed in the piece and relatively highly fast to perspiration.

8. Silk goods dyed in the piece and relatively highly fast to perspiration but not fast to boiling aqueous soapy liquid.

9. Goods dyed in the piece, said goods comprising silk and other fibers, and having the properties of being fast to washing but not fast to boiling aqueous soapy liquid.

10. Silk goods dyed in the piece and having the characteristics of fastness to washing in lukewarm soap water and of evenness in color.

11. Silk goods dyed in the piece and having the characteristics of fastness to washing in lukewarm soap water and of fastness to a hot iron.

12. Silk goods dyed in the piece and having the characteristics of fastness to washing in lukewarm soap water and of not bleeding in aqueous liquids.

13. Silk goods dyed in the piece, and having the characteristics of fastness to washing in lukewarm soap water, evenness in color, and fastness to a hot iron.

14. Silk goods dyed in the piece, and having the characteristics of fastness to washing in lukewarm soap water, evenness in color, fastness to a hot iron, and not bleeding in an aqueous liquid.

15. Silk goods dyed in the piece, and having the characteristics of fastness to washing in lukewarm soap water and evenness in color, and freedom from metallic mordants in the fiber.

16. Silk goods dyed in the piece and fast to washing in lukewarm soap water, and not containing any metallic mordant in the fiber.

17. Silk goods dyed in the piece to a light shade or color, and having the characteristics of fastness to washing in lukewarm soap water, and evenness in color.

18. Silk goods dyed in the piece to a light shade or color, and having the characteristics of fastness to washing in lukewarm soap water, evenness in color, and fastness to a hot iron.

19. Silk goods dyed in the piece to a light shade of color, and having the characteristics of fastness to washing in lukewarm soap water, evenness in color, and freedom from metallic mordants in the fiber.

20. Silk goods dyed in the piece to a light shade of color, and having the characteristics of fastness to washing in lukewarm soap water, evenness in color, freedom from metallic mordants in the fiber, and fastness to a hot iron.

21. Silk goods dyed in the piece and having the characteristics of fastness to washing in lukewarm soap water, evenness in color, and fastness to perspiration.

22. Silk goods vat dyed in the piece, and having the characteristics of fastness to washing in lukewarm soap water, and evenness in color.

23. Silk goods vat dyed in the piece, and having the characteristics of fastness to washing in lukewarm soap water, evenness in color, and fastness to a hot iron.

24. The process of treating silk piece goods comprising working them in a continuously boiling aqueous liquor containing an alkaline sodium phosphate, and adding to the bath a sodium sulphate and a dye.

25. The process of treating silk piece goods comprising working them in a continuously boiling aqueous liquor containing disodium hydrogen phosphate, adding a dye to the bath, and cleansing with a boiling soap liquor.

26. The process of treating silk piece goods comprising working them in a continuously boiling aqueous liquor containing an alkaline sodium phosphate, adding to the bath a sodium sulphate and a dye, and cleansing with a boiling soap liquor.

27. The process of treating silk piece goods comprising working them in a continuously boiling aqueous liquor containing an alkaline sodium phosphate and Turkey red oil, adding to the bath a sodium sulphate and a dye, and cleansing with a boiling soap liquor.

28. The process of treating silk piece goods comprising working them in a continuously boiling aqueous liquor containing disodium hydrogen phosphate, Turkey red oil, and soap, adding to the bath Glauber's salts and a dye, and cleansing with a boiling soap liquor.

29. The process of treating silk piece goods comprising working them in a continuously boiling aqueous liquor containing disodium hydrogen phosphate, Turkey red oil, and soap, adding to the dye bath Glauber's salts and a dye, cleansing with a boiling soap liquor, washing, and acidulating.

30. The process of treating silk piece goods comprising dyeing them in a boiling aqueous liquid, working them in a continuously boiling aqueous liquor containing an alkaline sodium phosphate, adding a dye thereto, and cleansing in a boiling soap liquor.

31. The process of treating silk piece goods comprising dyeing them in a boiling aqueous liquid, working them in a continuously boiling aqueous liquor containing disodium hydrogen phosphate, Turkey red oil, and soap, adding to the bath Glauber's salts and a dye, and cleansing in a boiling soap liquor.

32. The process of treating silk piece goods comprising dyeing them in a boiling aqueous liquid, diazotizing the dye, washing, developing, washing, working the goods in a continuously boiling aqueous liquor containing disodium hydrogen phosphate, Turkey red oil, and soap, adding to the dye bath Glauber's salts and a dye, cleansing in a boiling soap liquor, washing, and acidulating.

33. The process of treating silk piece goods comprising dyeing them in a boiling aqueous liquid, diazotizing the dye, working the goods in a boiling aqueous liquor containing Turkey red oil, adding to the dye bath Glauber's salts and a dye, and then cleansing, washing and acidulating.

34. The process of treating silk piece goods comprising dyeing them with a diazotizable dye, diazotizing the dye, again dyeing the goods in a liquor containing disodium hydrogen phosphate, and then cleansing in a boiling soap liquor.

35. The process of treating silk piece goods comprising dyeing them with a diazotizable dye, diazotizing the dye, again dyeing the goods in a liquor containing disodium hydrogen phosphate, and Turkey red oil, and then cleansing in a boiling soap liquor.

36. The process of treating silk piece goods comprising dyeing them with a diazotizable dye, diazotizing the dye, again dyeing the goods in a liquor containing disodium hydrogen phosphate and Turkey red oil, with the addition of Glauber's salts, and then cleansing in a boiling soap liquor.

37. The process of dyeing silk comprising treating it in a continuously boiling aqueous liquor, dyeing it therein, and fixing the dye upon the silk in the same boiling bath.

38. The process of dyeing silk comprising treating it in a continuously boiling aqueous liquor, then adding a dye thereto, and fixing the dye upon the silk.

39. The process of dyeing silk comprising treating it in a continuously boiling aqueous liquor containing disodium hydrogen phosphate and adding a dye thereto to dye the silk.

40. The process of dyeing silk comprising treating it in a continuously boiling aqueous liquor containing disodium hydrogen phosphate, Glauber's salts, Turkey red oil and soap, and adding a dye thereto.

41. The process of dyeing silk piece goods comprising treating them in a continuously boiling aqueous liquor, dyeing them therein and fixing the dye upon the silk.

42. The process of dyeing silk piece goods comprising treating them in a continuously boiling aqueous liquor containing disodium hydrogen phosphate, dyeing them therein and fixing the dye upon the silk.

43. The process of dyeing colored silk piece goods comprising working them in a boiling soap liquor containing a mordant and a color dye.

44. The process of dyeing silk piece goods comprising working them in a boiling liquor containing sodium phosphate, sulfonated castor oil, and Glauber's salts, and adding a dye thereto.

45. The process of dyeing silk piece goods comprising working them in a boiling aqueous liquid containing sodium phosphate and a sulfonated castor oil, and adding a dye thereto.

46. The process of dyeing silk piece goods comprising working them in a boiling aqueous liquid containing a sulfonated castor oil and Glauber's salts, and dyeing them therein.

47. The process of dyeing colored silk piece goods comprising working them in a boiling soap liquor containing a fixing agent, and adding a color dye to the liquor.

48. The process of dyeing silk piece goods comprising working them in a boiling soap liquor containing a fixing agent, and adding thereto a dye that will produce a light color and continuing the heating, substantially as described.

49. The process of dyeing silk piece goods comprising working them in a boiling soap liquor containing Glauber's salts and a sulfonated castor oil, and adding a dye thereto that will produce a light color, and continuing the heating, substantially as described.

50. The process of dyeing silk piece goods comprising working them in a boiling liquor containing Glauber's salts and a fixing agent, adding a dye thereto that will produce a light color, and continuing the heating.

JOSEPH SEYER.

DISCLAIMER.

REIS. 16,016.—*Joseph Seyer*, Hawthorne, N. J. WASHABLE DYED SILK PIECE GOODS AND PROCESS OF DYEING THEM. Patent dated March 3, 1925. Disclaimer filed June 2, 1927, by the assignee, *Standard Silk Dyeing Company.*

Hereby enters this disclaimer to the following:

To the silk piece goods specified in claims 1, 6, 10, 11, 13, 14, 16, 21, 24, 25, 41, and 46, in so far as they include black piece dyed goods.

To the silk goods specified in claims 2 and 12, except when evenly dyed with blended dyes in colors.

To the silk goods specified in claims 15 and 17, except when dyed with blended dyes in colors.

To the process specified in claim 47, except when blending dyes to make colored silk piece goods, and.

To the process specified in claim 50, except when working the piece goods in a boiling soap liquor and when blending dyes to make colored silk piece goods.

[*Official Gazette June 21, 1927.*]